April 26, 1927.　　　　　　1,626,284
A. L. JOHNSON
CONNECTER FOR TWO-PART DEMOUNTABLE RIMS
Filed May 17, 1920　　　2 Sheets-Sheet 1

Witness
C. F. Nelson

Inventor
Alvin L. Johnson
by attorneys
Southgate & Southgate

April 26, 1927. 1,626,284
A. L. JOHNSON
CONNECTER FOR TWO-PART DEMOUNTABLE RIMS
Filed May 17, 1920  2 Sheets-Sheet 2

Inventor
Alvin L. Johnson
By attorneys
Southgate & Southgate

Witness
C. F. Wesen

Patented Apr. 26, 1927.

1,626,284

UNITED STATES PATENT OFFICE.

ALVIN L. JOHNSON, OF WORCESTER, MASSACHUSETTS, ASSIGNOR, BY MESNE ASSIGNMENTS, TO ROBERT W. ROBINSON, JR., OF WORCESTER, MASSACHUSETTS, AND WALTER C. WATSON, OF LEICESTER, MASSACHUSETTS.

CONNECTER FOR TWO-PART DEMOUNTABLE RIMS.

Application filed May 17, 1920. Serial No. 382,135.

This invention relates to that type of demountable rims for carrying pneumatic tires in which the rim is formed in two pieces, one of which is removable from the other and from the tire in substantially an axial direction, and the other of which is then readily releasable from the tire by motion inwardly.

The objects of this invention are to provide bridge plates or connecters by which the two parts of the rim are secured together and in addition, a positive locking means for the connecters so that the rim section cannot become accidentally displaced under any conditions, and to so arrange and construct the connecters that they shall constitute handles by which the heavier section of the rim can be manipulated in a convenient manner. Further objects and advantages will appear hereinafter.

Reference is to be had to the accompanying drawings in which

Fig. 5 is a view similar to Fig. 2 showing a modification.

Figure 1:
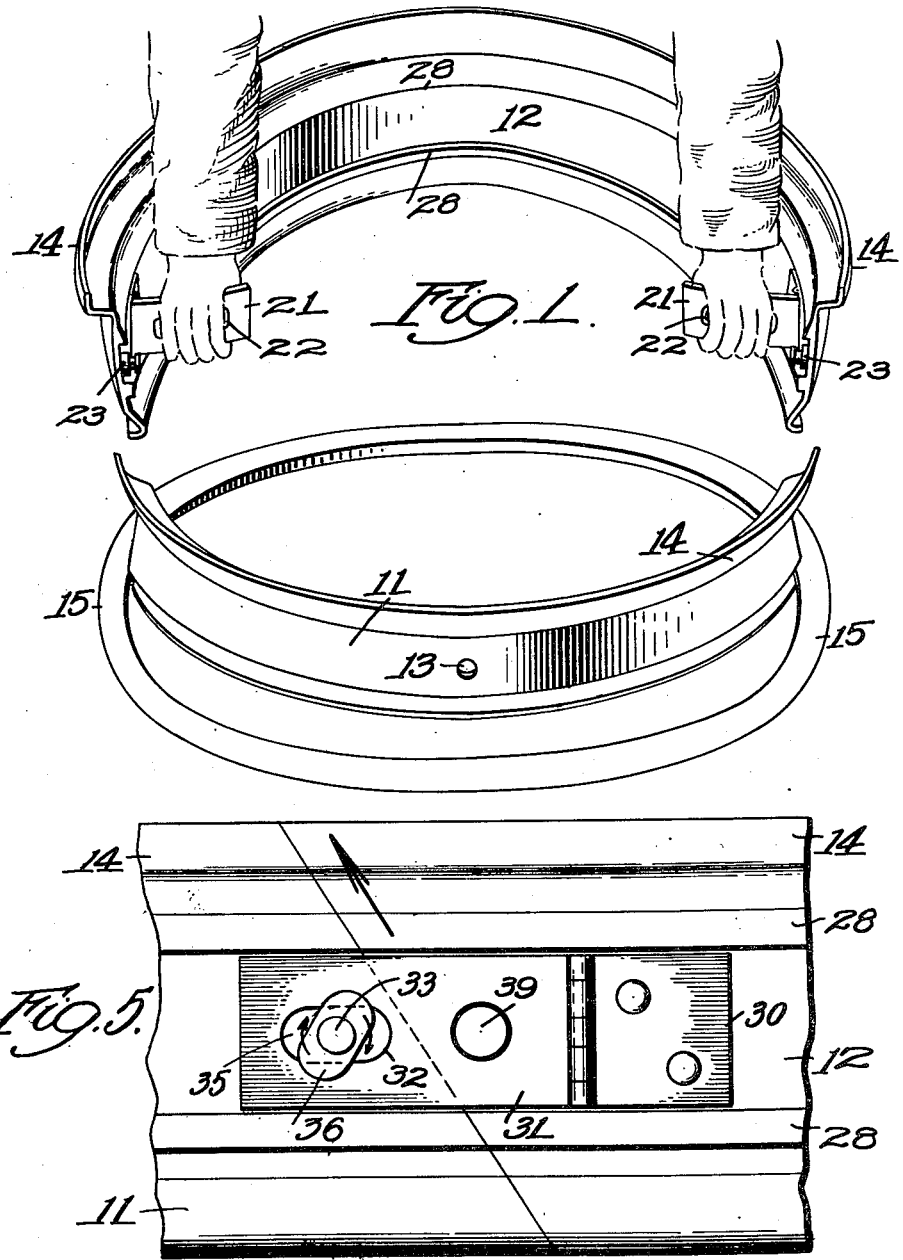
Fig. 1 is a perspective view of a rim constructed in accordance with this invention and showing the two parts separated in the natural way.
Figure 2:
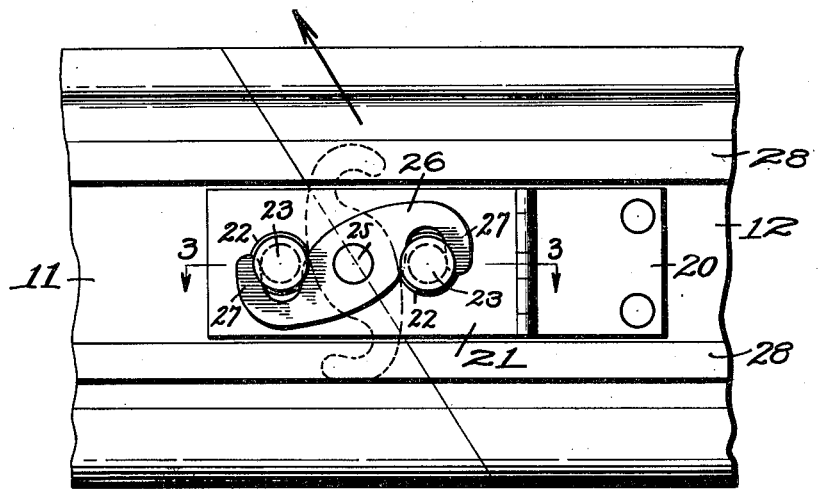
Fig. 2 is a side elevation on enlarged scale showing the inside of the rim at one of the points at which the two sections thereof come into contact and showing them locked together.

I have shown this invention as applied to a rim for carrying a pneumatic tire, the rim being divided into two sections 11 and 12. The section 11 is perforated at the center at 13 to receive the valve stem through it and is formed so as to constitute less than half a circle. The section 12 is formed to be greater than half a circle and the two together constitute exactly a complete circle.

The line of division between the two rim parts is shown on a slant. It may be straight or not, but it is slanted so that the edges of the longer rim section 12 overlap the abutting edges of the shorter rim section 11. The tire is held in position by the flange 14 on one side, which is formed integral with the two sections 11 and 12 and by a bead ring 15 on the other side. This bead ring is located in position by a segmental detachable locking ring (not shown) on the section 12, the ends of which enter recesses in the ends thereof. The section 11 is provided with a fixed and preferably integral projecting flange or ring (not shown) forming a continuation of the locking ring.

For the purpose of holding the two sections together, one of them, 12, is shown in Figs. 1 to 4 as provided with two plates 20 riveted thereto. To each of them is hinged a bridge plate or connecter 21 projecting beyond the end of that section. This connecter has two perforations 22 with conical walls. Both sections are provided with headed studs 23 at their ends, the shanks of which fit in these perforations 22 under the heads of which are necks 24 beyond the surfaces of the connecters or bridge plates 21 when the parts are brought down to their closed locked position shown in Fig. 3.

Figure 3:
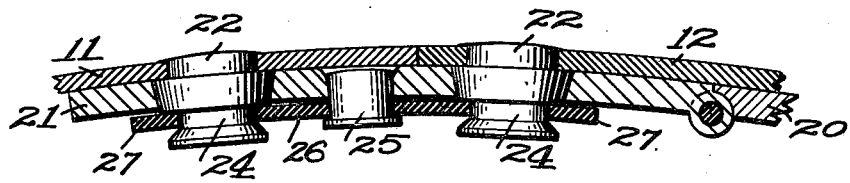
Fig. 3 is a longitudinal sectional view on the line 3—3 of Fig. 2.
Figure 4:
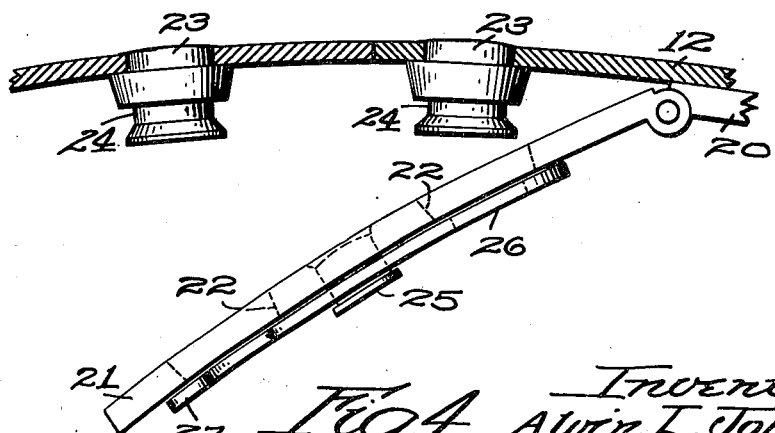
Fig. 4 is a similar view showing the sections unlocked and the movable connecter started away from the rim.

For the purpose of providing a positive locking means for each connecter 21 I provide a pivot, rivet or stud 25 thereon and pivot on it a lever 26. This lever is provided with two opposite rounded hooked ends 27 adapted to engage into the necks 24 of the studs 23. It will be understood of course that the elements just described are duplicated on the other side of the rim. This lever 26 can be swung from the unlocked position shown in dotted lines in Fig. 2, to the full line locked position. This is done simply by pressing on either end of the lever and swinging it into locking position. When the parts are locked together as shown in Fig. 3 there is no possible way in which the two rim sections can be separated without turning the locking lever 26. But in order to release it this lever can be turned around to the dotted line position in Fig. 2 and then the bridge plate 21 can be swung back as shown in Fig. 4. By this simple device therefore the rim sections are positively locked together by elements which are located on the inside of the rim and at both cuts. In other words both connecters are located in a convenient position and in a place where the operator, no matter how experienced, will readily see that the lever ought to be moved to the locking position in order to make it absolutely safe. The hinged plates 21 constitute handles by which the heavier rim section 12 can be lifted out as shown in Fig. 1.

It will be noted that the lever 26 is in effect a turn button and in Fig. 5 I have shown a modification in which the plate 30 has a hinged connecter or bridge plate 31 adapted to be locked by a turn button 36. This is mounted on a stud 35 carried by the rim section 11 and when turned to one position on its pivot 33, can pass through a perforation 32 of oblong shape in the plate 31. Another stud 39 is shown on the section 12 entering a second perforation in the bridge plate 31. The stud 35 is the same shape as the perforation 32 and button 36. The difference in construction will be obvious. The manner of operation and manipulation is substantially the same as with the other form shown in Figs. 1 to 4.

The bridge plates 21 or 31, when locked, hold the rim against separation circumferentially by the location of the fixed studs 23 and 35. Separation axially is prevented by the locking ring, also by the stud 35 in Fig. 5, and by the engagement of the hinged plates 21 and 31 against the integral interior ribs 28 on the rim, between which they fit.

Although I have illustrated and described only two forms of the invention and shown it as applied to only one type of rim I am aware of the fact that other modifications can be made therein by persons skilled in the art and that it can be used in connection with other devices than that shown, without departing from the scope of the invention as expressed in the claims.

Therefore I do not wish to be limited to all the details of construction herein shown and described, but what I do claim is:—

1. The combination of a wheel rim for carrying a pneumatic tire, said rim consisting of two sections only, one longer than the other and separable from each other by motion of the longer one axially away from the shorter section, with means on both ends of the longer section hinged on parallel axes and located substantially diametrically opposite each other and constituting handles for manipulating the longer section, for engagement with the shorter section to lock the two sections together.

2. The combination of a pneumatic tire carrying rim consisting of two separate sections, one comprising more than a semi-circle and the other less than a semi-circle, but together constituting a complete circle, the edge of the longer section overlapping the edge of the shorter section on one side where they come into contact, whereby the longer section can be lifted in an axial direction away from the shorter section and out of a tire carried thereby, with a headed stud immovably carried by each end of the longer section, a headed stud fixed to each end of one section, a pair of plates hinged to the shorter section, each having two slots for receiving said studs, and means for locking the hinged plates.

3. The combination with a transplit rim, of a bridge plate attached to one end and projecting beyond said split and having an opening in said projecting portion, a stud carried by the other end of the rim and fitting into said opening in the bridge plate, and a latch pivoted to the bridge plate and engaging the stud to prevent radial separation of said plate and stud.

4. The combination with a transplit rim, of a stud carried by one end of the rim, a bridge plate attached to the other end and having an opening to receive said stud, and a latch pivoted to the bridge plate and engaging the stud, one of said engaging members being recessed or notched.

In testimony whereof I have hereunto affixed my signature.

ALVIN L. JOHNSON.